(12) United States Patent
Potter et al.

(10) Patent No.: US 12,737,541 B2
(45) Date of Patent: Sep. 15, 2026

(54) DEEP MODEL INTEGRATION TECHNIQUES FOR MACHINE LEARNING ENTITY INTERPRETATION

(71) Applicant: Optum, Inc., Minnetonka, MN (US)

(72) Inventors: Brian C. Potter, Carlsbad, CA (US); Ryan Michael Swan, Santa Monica, CA (US); Rafael Campos Do Amaral e Vasconcellos, Plymouth, MN (US); Fraser Ian Lockwood, Dacula, GA (US)

(73) Assignee: Optum, Inc., Minnetonka, MN (US)

( * ) Notice: Subject to any disclaimer, the term of this patent is extended or adjusted under 35 U.S.C. 154(b) by 293 days.

(21) Appl. No.: 18/493,472

(22) Filed: Oct. 24, 2023

(65) Prior Publication Data

US 2025/0131196 A1 Apr. 24, 2025

(51) Int. Cl.
*G06F 40/279* (2020.01)
*G06N 20/00* (2019.01)
*G06T 11/60* (2006.01)

(52) U.S. Cl.
CPC ........... *G06F 40/279* (2020.01); *G06N 20/00* (2019.01); *G06T 11/60* (2013.01)

(58) Field of Classification Search
None
See application file for complete search history.

(56) References Cited

U.S. PATENT DOCUMENTS 10,395,772 B1 8/2019 Lucas et al.
10,593,426 B2 3/2020 Amarasingham et al.
10,943,681 B2 3/2021 Yao et al.
11,205,516 B2 12/2021 Lieberman
11,244,755 B1 2/2022 Syeda-Mahmood et al.
2017/0098153 A1* 4/2017 Mao .................... G06N 3/044
2017/0124432 A1* 5/2017 Chen .................... G06F 40/30
(Continued)

OTHER PUBLICATIONS

Bohr, et al., "The Rise of Artificial Intelligence in Healthcare Applications", Artificial Intelligence in Healthcare, 37 Pages, (2020), doi.org/10.1016/B978-0-12-818438-7.00002-2.
(Continued)

*Primary Examiner* — Nafiz E Hoque
(74) *Attorney, Agent, or Firm* — Alston & Bird LLP

(57) ABSTRACT

Various embodiments of the present disclosure provide machine learning training techniques for implementing a multi-modal interpretation process to generate holistic outputs for an event. The techniques may include generating, using first layers of a multi-modal machine learning model, text-based intermediate representations for an entity based on textual input data. The techniques include generating, using second layers of the multi-modal machine learning model, image-based intermediate representations for the entity based on the text-based intermediate representations and input images for the entity. The techniques include generating, using one or more third layers of the multi-modal machine learning model, an entity representation summary based on the image-based intermediate representations and an image narrative summary for the input images. The techniques include initiating the performance of a prediction-based action based on the entity representation summary.

20 Claims, 6 Drawing Sheets

(56) References Cited

U.S. PATENT DOCUMENTS

| | | | | |
|---|---|---|---|---|
| 2019/0290172 | A1 | 9/2019 | Hadad et al. | |
| 2021/0232773 | A1* | 7/2021 | Wang | G06F 40/284 |
| 2021/0343411 | A1 | 11/2021 | Zhang et al. | |
| 2024/0185588 | A1* | 6/2024 | Kumari | G06V 10/778 |

OTHER PUBLICATIONS

Esteva, et al., "A Guide to Deep Learning in Healthcare", Nature Medicine, vol. 25, pp. 24-29, Jan. 2019, DOI: 10.1038/s41591-018-0316-z.

* cited by examiner

600

GENERATE ONE OR MORE TEXT-BASED INTERMEDIATE REPRESENTATIONS 602

GENERATE ONE OR MORE IMAGE-BASED INTERMEDIATE REPRESENTATIONS BASED ON THE ONE OR MORE TEXT-BASED INTERMEDIATE REPRESENTATIONS AND ONE OR MORE INPUT IMAGES 604

GENERATE AN ENTITY REPRESENTATION SUMMARY BASED ON THE ONE OR MORE IMAGE-BASED INTERMEDIATE REPRESENTATIONS AND AN IMAGE NARRATIVE SUMMARY 606

INITIATE THE PERFORMANCE OF A PREDICTIVE ACTION BASED ON THE ENTITY REPRESENTATION SUMMARY 608

FIG. 6

DEEP MODEL INTEGRATION TECHNIQUES FOR MACHINE LEARNING ENTITY INTERPRETATION

BACKGROUND

Various embodiments of the present disclosure address technical challenges related to machine learning models generally and, more specifically, the use of machine learning models for interpreting natural language text and images. Traditionally, machine learning models are tailored to the interpretation of a specific type of data, such as images or text. To accommodate of multi-modal datasets, multiple, individually trained models are traditionally leveraged to individually process and interpret each type of data in the multi-modal dataset. While outputs from each of these models may aggregated to generate a multi-modal output, the outputs themselves are individually derived from one type of data and are subject to defects associated with the type of data.

For example, traditionally, text documents, such as those representing patient medical records in a clinical domain, may be interpreted using algorithmic and/or machine learning techniques. Using such techniques, text documents may be initially digested by artificial intelligence to identify and distill targeted concepts. These algorithms may be manually crafted and purpose built by subject matter experts to create human-interpretable outputs that capture a variety of information for a specific domain, such as medical conceptual information in the clinical domain. The outputs of these systems may take the form of a variety of different data, including tabular concept presence, extracted text passages, temporal data, and metadata related to the document type and point of capture. These structured outputs may be presented to consumers or used to create summary documentation that may condense and reformat information into standardized forms.

The algorithmic natural language processing (NLP) approach has several strengths. It is highly accurate, since concepts are individually targeted to specific use cases. It may be quickly modified and iteratively developed by engineers without the need to wait for large amounts of training data and identified information may be linked to human produced text passages with relative ease. Its tradeoffs, however, are that it is rigid due to its rule-based form, may struggle with complex concepts that span multiple documents, and when used for many concepts its requirements may be intensive in both computation and storage. More complex deep learning approaches may also capture and encode broad representations of textual features. Deep learning excels with natural language and is able to discern complex relationships between many concepts. However, it produces outputs that are difficult to interpret by human experts, and it is often difficult to ascertain the degree to which specific evidence contributed to its decision. Deep learning solutions have also historically required large amounts of training data and have tended to struggle to identify context that builds through a temporal history spread across long documents.

As another example, traditionally, images, such as radiology images in a clinical domain, may be interpreted using artificial intelligent solutions that flag and/or infer one or more features from the pixels of an image. While powerful, image artificial intelligence (AI) is traditionally limited to pixel information from one or more images and fails to learn from pertinent features outside the scope of the images, such as historical context from text accompanying the images. In a clinical narrative, this prevents image AI from reporting or inferring from a patient's history of cancer risk factors, lab results that contribute to a diagnosis of disease, and/or the like. Moreover, image AI will not benefit from clinical findings from previous imaging studies, particularly if performed at different facilities, if those findings are only available in a text form. While the coverage and application of image AI is increasing, there are clinical factors visible to a reviewing radiologist that all or any individual image AI solution may yet be trained to capture.

Various embodiments of the present disclosure make important contributions to various existing machine learning interpretation techniques by addressing each of these technical challenges.

BRIEF SUMMARY

Various embodiments of the present disclosure provide multi-modal entity interpretation techniques that leverage insights from both textual and image-based information to generate holistic machine learning outputs that compensate for the deficiencies of single modal (e.g., text or image only) techniques. To do so, some embodiments of the present disclosure present a fully connected multi-modal machine learning model with multiple text- and image-based layers that are configured to generate, pass, augment, and reinterpret intermediate representations. While the intermediate representations created by deep learning models may not be interpretable to humans, they are rich in context for downstream machine learning models. These encoded representations may be consumed and combined with additional information and machine learning outputs to create aggregated contextual representations, which may in turn be passed to other downstream models and/or layers of the multi-modal machine learning model. Some embodiments of the present disclosure allow (i) the tracking of this information as an additional history object that may be updated across imaging events for an entity and (ii) the incorporation of accompanying NLP extracted context into a mixed record that is simultaneously an interpretable record of algorithmic findings and machine learning objects that both encode history and have the capacity to create narrative text explanations, able to incorporate outputs of imaging, and/or any other complex recorded history.

In some embodiments, a computer-implemented method includes generating, by one or more processors and using one or more first layers of a multi-modal machine learning model, one or more text-based intermediate representations for an entity based on textual input data; generating, by the one or more processors and using one or more second layers of the multi-modal machine learning model, one or more image-based intermediate representations for the entity based on the one or more text-based intermediate representations and one or more input images for the entity; generating, by the one or more processors and using one or more third layers of the multi-modal machine learning model, an entity representation summary based on the one or more image-based intermediate representations and an image narrative summary for the one or more input images; and initiating, by the one or more processors, the performance of a prediction-based action based on the entity representation summary.

In some embodiments, a computing system includes memory and one or more processors communicatively coupled to the memory, the one or more processors are configured to generate, using one or more first layers of a multi-modal machine learning model, one or more text-based intermediate representations for an entity based on textual input data; generate, using one or more second layers of the multi-modal machine learning model, one or more image-based intermediate representations for the entity based on the one or more text-based intermediate representations and one or more input images for the entity; generate, using one or more third layers of the multi-modal machine learning model, an entity representation summary based on the one or more image-based intermediate representations and an image narrative summary for the one or more input images; and initiate the performance of a prediction-based action based on the entity representation summary.

In some embodiments, one or more non-transitory computer-readable storage media include instructions that, when executed by one or more processors, cause the one or more processors to generate, using one or more first layers of a multi-modal machine learning model, one or more text-based intermediate representations for an entity based on textual input data; generate, using one or more second layers of the multi-modal machine learning model, one or more image-based intermediate representations for the entity based on the one or more text-based intermediate representations and one or more input images for the entity; generate, using one or more third layers of the multi-modal machine learning model, an entity representation summary based on the one or more image-based intermediate representations and an image narrative summary for the one or more input images; and initiate the performance of a prediction-based action based on the entity representation summary.

BRIEF DESCRIPTION OF DRAWINGS

FIG. 6 is a flowchart showing an example of a process for interpreting information across multiple modes of representations in accordance with some embodiments discussed herein.

DETAILED DESCRIPTION

Figure 1:
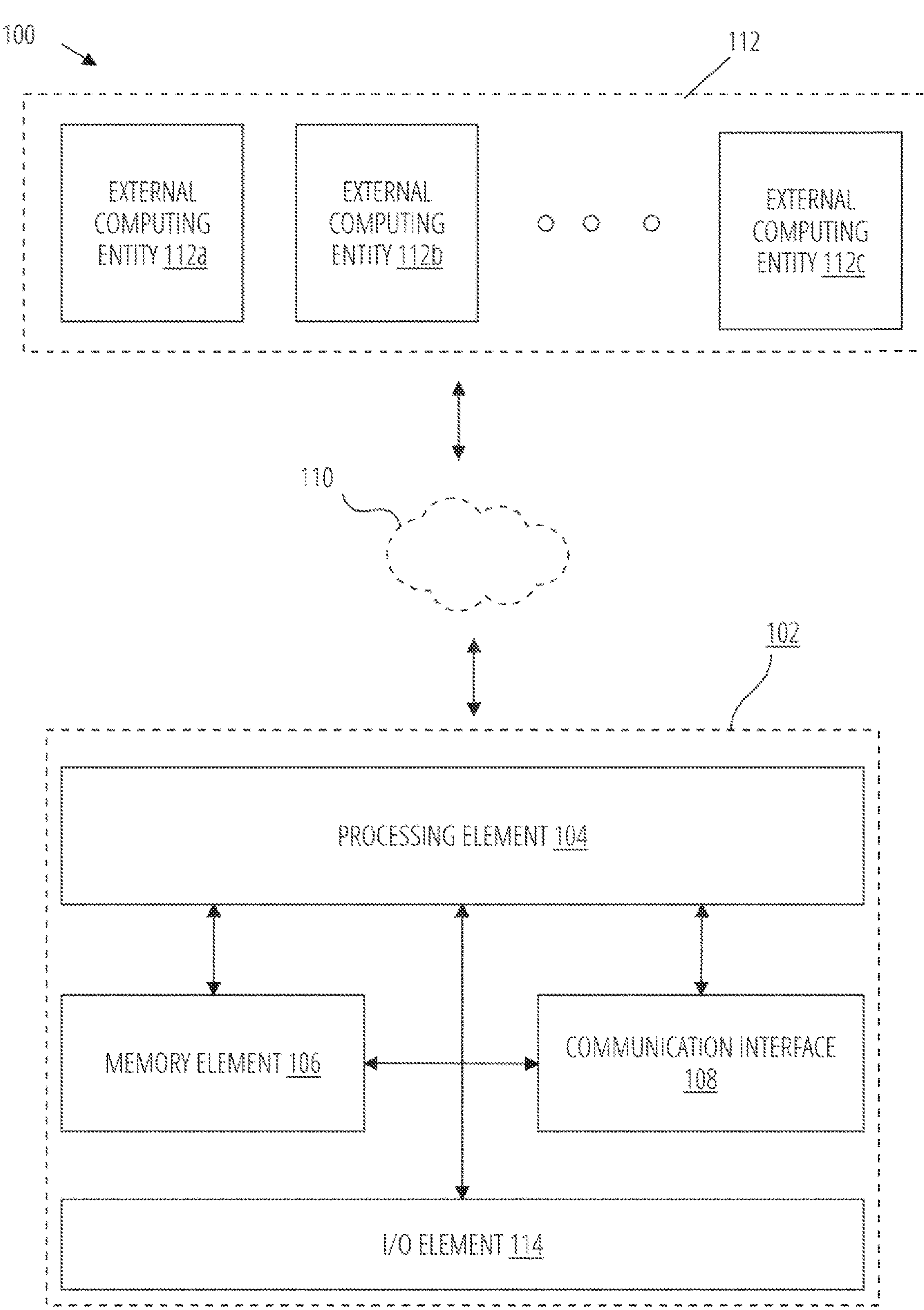
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout. Moreover, while certain embodiments of the present disclosure are described with reference to predictive data analysis, one of ordinary skills in the art will recognize that the disclosed concepts may be used to perform other types of data analysis.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112*a-c* communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112*a-c* to perform one or more steps/operations of one or more techniques (e.g., prediction techniques, summarization techniques, data interpretation techniques, training techniques, and/or the like) described herein.

The external computing entities 112*a-c*, for example, may include and/or be associated with one or more entities that may be configured to receive, store, manage, and/or facilitate datasets that include labeled training data, historical entity records, contextual records, historical summaries, and/or the like. The external computing entities 112*a-c* may provide the input data, such as text-based input data, one or more input images, and/or the like to the predictive computing entity 102 which may leverage the input data to generate an entity representation summary. By way of example, the predictive computing entity 102 may include a multi-modal machine learning model that is configured to leverage text- and image-based data to generate an output for an imaging event. In some examples, the input data may include an aggregation of data from across the external computing entities 112*a-c* into one or more input data objects (and/or training data object during training of the multi-modal machine learning model). The external computing entities 112*a-c*, for example, may be associated with one or more data repositories, cloud platforms, compute nodes, organizations, and/or the like, that may be individually and/or collectively leveraged by the predictive computing entity 102 to obtain and aggregate data for a prediction domain.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112*a-c*, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
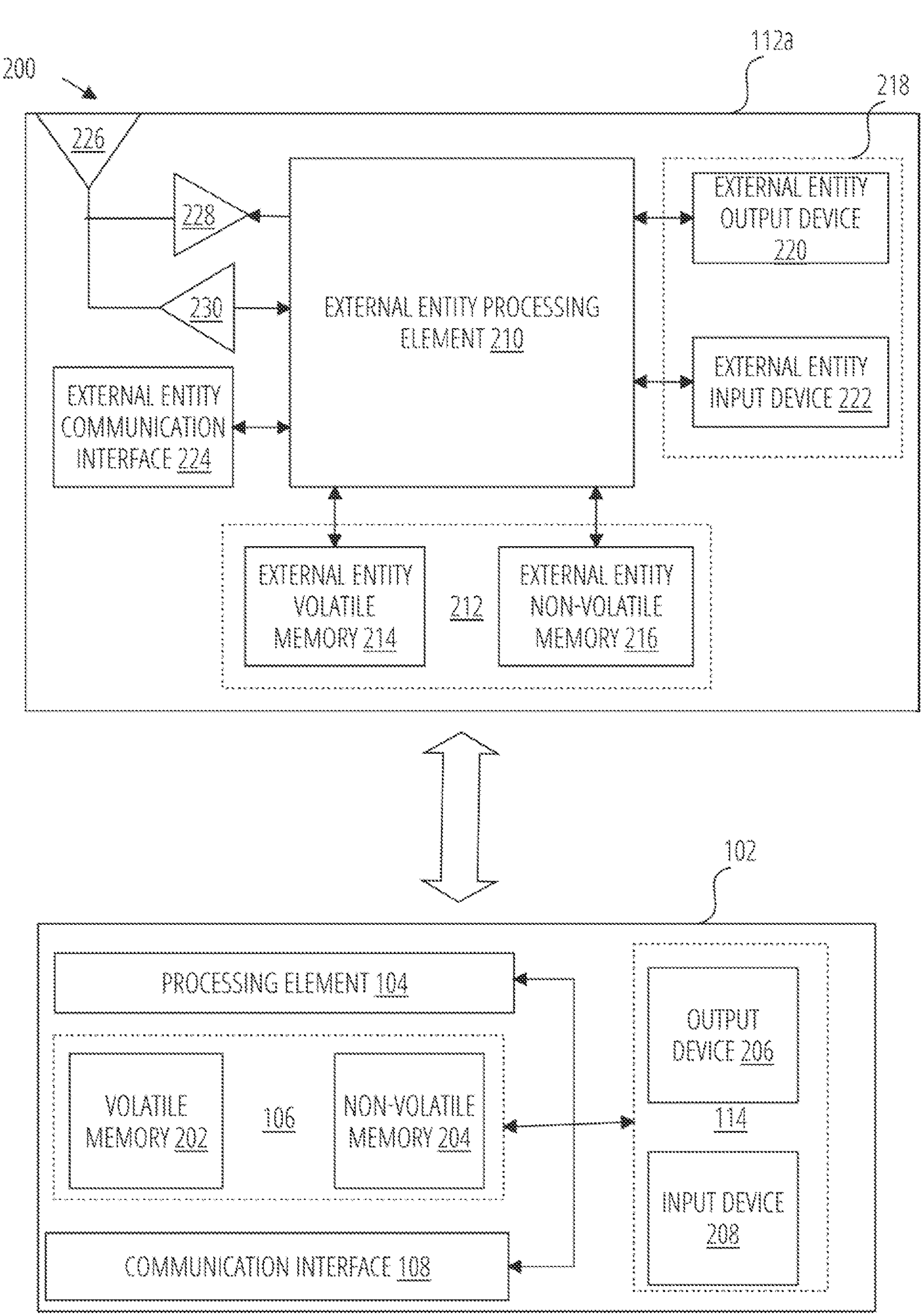
FIG. 2 is a schematic diagram showing a system computing architecture in accordance with one or more embodiments of the present disclosure.

FIG. 2 is a schematic diagram showing a system computing architecture 200 in accordance with some embodiments discussed herein. In some embodiments, the system computing architecture 200 may include the predictive computing entity 102 and/or the external computing entity 112*a* of the computing system 100. The predictive computing entity 102 and/or the external computing entity 112*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more steps/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product includes non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112*a*. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112*a* may include an external entity processing element 210, an external entity memory element 212, an external entity communication interface 224, and/or one or more external entity I/O elements 218 that communicate within the external computing entity 112*a* via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112*a* may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112*a* may be capable of operating with one or more air interface standards, communication protocols, modulation types, and access types. More particularly, the external computing entity 112*a* may operate in accordance with any of a number of wireless communication standards and protocols, such as those described above with regard to the predictive computing entity 102.

Via these communication standards and protocols, the external computing entity 112*a* may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112*a* may also download changes, add-ons, and updates, for instance, to its firmware, software (e.g., including executable instructions, applications, program modules), operating system, and/or the like.

According to one embodiment, the external computing entity 112*a* may include location determining embodiments, devices, modules, functionalities, and/or the like. For example, the external computing entity 112*a* may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112*a* in connection with a variety of other systems, including cellular towers, Wi-Fi access points, and/or the like. Similarly, the external computing entity 112*a* may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112*a* to interact with and/or cause the display, announcement, and/or the like of information/data to a user. The user input interface may include any of a number of input devices or interfaces allowing the external computing entity 112*a* to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112*a* and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "multi-modal machine learning model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A multi-modal machine learning model may include one or more machine learning models configured, trained (e.g., jointly, separately, etc.), and/or the like to generate an output (e.g., prediction, classification, coding, summarization, and/or the like) from a combination of related text- and image-based inputs. A multi-modal machine learning model may include one or more of any type of machine learning model including one or more supervised, unsupervised, semi-supervised, reinforcement learning models, and/or the like. In some examples, a multi-modal machine learning model may include multiple models configured to perform one or more different stages of a joint text and image interpretation process.

In some embodiments, a multi-modal machine learning model includes a plurality of model layers. The model layers may include one or more text-based layers and/or one or more image-based layers. For example, a multi-modal machine learning model may include one or more connected text-based layers and/or image-based layers that provide and/or receive one or more inputs from each other to collectively generate an entity representation summary. The connected layers, for example, may pass intermediate representations, such as weight matrices, that directly influence the processing of subsequent layers based on insights learned through the processing performed by preceding layers. In this way, insights may be learned from a first data type (e.g., image, text, etc.) and passed to a subsequent layer configured to leverage the insights to process a second data type (e.g., image, text, etc.) different from the first data type.

One or more connected layers, for example, may include one or more first, second, and/or third layers. One or more first layers may form a first text-based layer configured to generate a text-based intermediate representation for consumption by one or more second layers. One or more second layers may form an image-based layer, subsequent to the first text-based layer, that is configured to receive a text-based intermediate representation from the first text-based layer and generate an image-based intermediate representation for consumption by one or more third layers. One or more third layers may form a second text-based layer, subsequent to the image-based layer, that is configured to receive an image-based intermediate representation from the image-based layer and generate an entity representation summary for output.

In some embodiments, a multi-modal machine learning model is trained using one or more supervised training techniques. For example, the plurality of layers may be trained end-to-end using a labeled training dataset. In addition, or alternative, the plurality of layers may be trained at least partly individually, for example, by freezing one or more weights of a subset of layers, while training another subset of layers. Each of the plurality of layers may be trained using one or more supervised training techniques, such as back propagation of errors based on a loss function tailored to the desired output (e.g., ground truths in the labeled training dataset).

In some embodiments, a multi-modal machine learning model is configured (e.g., trained, etc.) to generate one or more outputs based on a prediction domain. For example, a multi-modal machine learning model may be trained to generate a classification, impute information and/or coding, and/or to enhance computing tasks, such as quality review. As one example, in a clinical domain, a multi-modal machine learning model may improve the performance with respect to disease imputation, classification, and coding, and provides the mechanisms for each individual solution to be used for quality review and enhancement of the other.

In some embodiments, the term "text-based layer" refers to a component of a multi-modal machine learning model. A text-based layer may include a data entity that describes parameters, hyper-parameters, and/or defined operations of a rules-based and/or machine learning model (e.g., model including at least one of one or more rule-based layers, one or more layers that depend on trained parameters, coefficients, and/or the like). A text-based layer may include one or more machine learning models configured, trained (e.g., jointly, separately, etc.), and/or the like to generate an output (e.g., prediction, classification, summarization, text-based intermediate representation, and/or the like) from text-based inputs, such as natural language and/or structured text. A text-based layer may include one or more of any type of machine learning model including one or more supervised, unsupervised, semi-supervised, reinforcement learning models, and/or the like. In some examples, a text-based layer may include multiple models configured to perform one or more different stages of a text interpretation process.

In some embodiments, a text-based layer includes a machine learning and/or rules based natural language processor. In some examples, a text-based layer may be configured to perform one or more algorithmic natural language processing operations, such as extraction and/or reasoning. An extraction operation, for example, may identify evidence of the presence and/or absence of various indicators in a narrative input text. For example, in a clinical domain, this may involve mentions of medical procedures, drugs, or vital measurements. A reasoning operation, for example, may include reasoning over extracted concepts (e.g., individually and/or in combination) from a narrative input text to give rise to more complex concepts. For example, in a clinical domain, a patient with a history of low body weight and drug references to specific medications may match to a certain cancer subtype, while the same patient with a high regiment of prescribed vitamin intake may be indicative of malnutrition.

In some embodiments, the term "image-based layer" refers to a component of a multi-modal machine learning model. An image-based layer may include a data entity that describes parameters, hyper-parameters, and/or defined operations of a rules-based and/or machine learning model (e.g., model including at least one of one or more rule-based layers, one or more layers that depend on trained parameters, coefficients, and/or the like). An image-based layer may include one or more machine learning models configured, trained (e.g., jointly, separately, etc.), and/or the like to generate an output (e.g., prediction, classification, summarization, image-based intermediate representation, and/or the like) from input images, such as a collection of pixels. An image-based layer may include one or more of any type of machine learning model including one or more supervised, unsupervised, semi-supervised, reinforcement learning models, and/or the like. In some examples, an image-based layer may include multiple models configured to perform one or more different stages of an image interpretation process.

In some embodiments, an image-based layer includes a neural network architecture. For example, an image-based layer may include one or more deep neural networks, such as one or more multilayer perceptrons (MLPs), convolutional neural networks (CNNs), recurrent neural networks (RNNs), and/or the like. An image-based layer may be applied in any type of prediction domain to interpret a collection of pixels for generating a classification, prediction, and/or the like. As one example, an image-based layer may be applied in a clinical domain to automatically identify suspect clinical factors and conditions directly from diagnostic images, such as radiology images including one or more of x-rays, MRIs, CT scans, Ultrasounds, and/or the like. Suspect conditions and/or clinical factors, for example, may include, among many others, pneumonia, congestive heart failure, specific lesions in the liver or breasts along with their characteristics such as size, shape, specific location, and/or the like. In some examples, an image-based layer is trained via the application of machine/deep learning algorithms on large numbers of images with known clinical findings. By way of example, an image-based layer may receive an input image that may be represented as arrays of pixel intensities. An image-based layer may be trained (e.g., jointly and/or individually) on these examples then have a level of predictive accuracy on new, previously unseen images.

In some embodiments, the term "labeled training dataset" refers to a dataset with one or more training input data objects and one or more training labels corresponding to the training input data objects. Each training input data object, for example, may include a historical and/or synthetic entity with textual input data and/or image input data. A training input data object may correspond with a training label that describes a target output for the multi-modal machine learning model and/or one or more layers thereof. For example, a training input data object may include an input to the multi-modal machine learning model and/or an input to a layer of the multi-modal machine learning model. In addition, or alternatively, a target output may include a desired output from the multi-modal machine learning model and/or a desired output (e.g., an object classification and/or object characteristics from an image for an image-based layer, an optimal summary for a text-based layer, etc.) from a layer of the multi-modal machine learning model.

A training input data object and corresponding training label may depend on the prediction domain. By way of example, in a clinical domain, a training input data object may include patient records associated with a radiology screen and radiology imaging. A training label corresponding to the training input data object may include a disease imputation (e.g., identifying the possibility of lung cancer), a classification (e.g., specifying the clinical severity of a lesion), coding (e.g., assigning appropriate ICD-10 CM codes to a chart), and/or any other target output for the multi-modal machine learning model.

In some embodiments, a target output for a multi-modal machine learning model is a diagnosis for a clinical visit associated with both text-based and image-based input, such as a radiology screening. A labeled training dataset may include training input data objects that include (i) medical records and/or other textual information associated with the radiology screening and (ii) radiology images from the screening. A corresponding training label May include a target diagnosis from the radiology screening. In some examples, the labeled training dataset may include historical radiology screening records in which a physician provides a target diagnosis that is used to train the multi-modal machine learning model. For example, by training a multi-modal machine learning model to approximate clinician output in a similar format, it is possible to compare the resulting concepts from the text- and image-based layers to approximate agreement between them. A multi-modal machine learning model trained on images and patient history or demographic data may contain some degree of mutually exclusive information with a human produced account.

In some examples, once trained, a multi-modal machine learning model may stochastically generate many outputs from the same encounter, allowing comparison between those outputs for NLP-identified concepts, leading to approximation of the confidence in each concept. These agreement scores may be leveraged to find cases that are more likely to have omitted information, but also to identify which medical concepts are the most difficult to identify for subject matter experts. This information may guide subject matter expert education by identifying training opportunities, and potentially by creating generated outputs that demonstrate the concepts (i.e., review questions).

In some embodiments, the term "entity" refers to a data element that is associated with input data for a multi-modal machine learning model. An entity may include a data element that is associated with both textual input data and one or more input images. An entity may depend on a prediction domain. For example, in a clinical domain, an entity may represent a patient that is associated with a clinical event, such as a radiology screening, in which the patient is imaged to generate the one or more input images. In such a case, the textual input data may include medical records and/or an order for the clinical screening.

In some embodiments, the term "textual input data" refers to a data entity that describes natural language information. Textual input data may include any form of textual data, such as natural language documentation recorded, received, and/or generated (e.g., through one or more generative artificial intelligence techniques) for any type of prediction domain. In some examples, textual input data may include a historical entity data record and/or a contextual image record. A historical entity data record may include textual information indicative of historical information for an entity that is not directly related to an input image. A contextual image record may include textual information indicative of textual information directly describing an input image.

In this regard, textual input data may depend on the prediction domain. In some examples, for a clinical domain, a historical entity data record may include documentation of patient medical history. This may take the form of doctor's notes, vital measurements, familial health histories, and/or other narrative artifacts. In addition, or alternatively, a contextual image record may include an imaging order for an input image, a diagnostic hypothesis for the image, a write-up of an exam from imaging.

In some embodiments, the term "intermediate representation" refers to an intermediate output generated by a layer of a multi-modal machine learning model. In some examples, an intermediate representation may include a structured textual output and/or a weight matrix. In some examples, an intermediate representation may be augmented after each layer of a multi-modal machine learning model to pass insights from one modal layer to the next in at least a machine readable format. In this way, an intermediate representation may include an augmented data representation that merges imaging data and upstream machine learning outputs from a textual input data and an input image into a combined machine learning output that combines complex contexts into a more holistic embedded view of an imaging event. For example, insights captured by one or more text- and/or image-based layers may be fed to a subsequent layer as a series of vectors (e.g., embeddings, etc.), such as a weight matrix, and/or a structured textual format, such as a structured textual output, allowing the subsequent layer to take advantage of both human readable and machine readable the concepts identified by each preceding layer.

By way of example, a weight matrix may include complex matrices of sets of weights indicative of a last layer of a preceding portion (e.g., text- and/or image-based layer) of a multi-modal machine learning model. In addition, or alternatively, a structured textual output may be indicative of structured textual information that is extracted from textual input data and/or input image. A structured textual output, for example, may include an XML output that defines one or more segments of text extracted and/or generated for an input to a layer of the multi-modal machine learning model. By way of example, the one or more segments of text may be extracted from textual input data (e.g., by an extraction layer) and/or inferred (e.g., generated) from the textual input data (e.g., by a reasoning layer).

In some embodiments, the term "text-based intermediate representation" refers to an intermediate representation generated by a text-based layer of a multi-modal machine learning model. In some examples, a text-based intermediate representation may include an initial structured textual output and/or initial weight matrix output by a first text-based layer of a multi-modal machine learning model. In some examples, text-based intermediate representation may include an initial structured textual output, such as a first structured XML output, and an initial weight matrix, such as an encoded weight representation. These inputs may be consumed together by an image-based layer of a multi-modal machine learning model that may include a purpose specific neural network, with the ability to consume the initial structured textual output, the initial weight matrix, and an input image. The new context of the imaging allows the initial weight matrix to be reinterpreted, boosting the likelihood of concepts identified by the text-based layer. It is also able to use this context to highlight the most salient parts of the image.

In some embodiments, the term "input image" refers to a data entity that describes pixel information. An input image may include any form of image data, such a red, green, blue ("RGB") image, an infrared image, a diagnostic image, and/or the like, that is received, and/or generated for any type of prediction domain. In this regard, input image may depend on the prediction domain. For example, in a clinical domain, an input image may include radiology images, such as X-Rays, MRIs, CT Scans, and Ultrasounds, and/or the like. In some examples, an input image may be processed by an image-based layer to detect suspect condition and clinical factor examples that include, among many others, pneumonia, congestive heart failure, or specific lesions in the liver or breasts along with their characteristics such as size, shape, and specific location, etc.

In some embodiments, the term "image-based intermediate representation" refers to an intermediate representation generated by an image-based layer of a multi-modal machine learning model. In some examples, an image-based intermediate representation may include an augmented structured textual output and/or an augmented weight matrix output by a second layer, such as a first image-based layer following a text-based layer of a multi-modal machine learning model.

In some embodiments, an image-based intermediate representation includes an augmented structured textual output and/or an augmented weight matrix. An augmented structured textual output may include structured textual information extracted from an input image. An augmented weight matrix may include complex matrices or sets of weights output by a last layer of an image-based layer. In some examples, these inputs may be consumed together by a text-based layer of a multi-modal machine learning model that may include a purpose specific neural network, with the ability to consume an augmented structured textual output, an augmented weight matrix, and/or a textual summary.

In some embodiments, the term "user summary" refers to natural language text provided by a user to describe an input image. By way of example, a user summary may include a textual summary of an imaging event. The textual summary may be manually generated by a human based on a human's interpretation of an input image and/or contextual textual input data. By way of example, in a clinical domain, a user summary may include a diagnosis for a clinical visit, such as a radiology screening.

In some embodiments, the term "entity representation summary" refers to an output of the multi-modal machine learning model. An entity representation summary may include an unpacked intermediate representation output from a final layer (e.g., a second text-based layer, etc.) of a multi-modal machine learning model. In some examples, an intermediate representation may be unpacked in a variety of different ways. For example, the same upstream embedded output may be merged with unstructured textual data (e.g., clinician findings, etc.) to focus concept extraction on a classical natural language processing system by highlighting or de-emphasizing the importance of various textual observations. Using large language models (LLM) the same embedded representation could also be unpacked into a machine-generated imaging description in plain text, a machine "impression" or "intuition" of a case, similar to that of an expert user (e.g., a radiologist in a clinical domain, etc.), that may be presented along with the imaging data for review of the case by the user (e.g., a radiologist, etc.).

In some embodiments, an entity representation summary is a natural language text, such as a diagnosis for a clinical imaging event. In such a case, an entity representation summary for an encounter may be directly consumed by downstream text-based layers, which may extract insights (e.g., via a rule-based process, etc.) from the machine-generated text, allowing additional capture of information for downstream tasks.

In some embodiments, the term "performance insight" refers to a comparison between one or more components of a multi-modal machine learning model. For instance, a performance insight may be based on a comparison between a user summary and an entity representation summary output by the multi-modal machine learning model. In addition, or alternatively, a performance insight may be based on a comparison between an image-based structured textual representation output by an image-based layer and/or a text-based structured textual representation output by a text-based layer of the multi-modal machine learning model. A performance insight may be indicative of one or more differences and/or similarities between at least two different components of the multi-modal machine learning model. In some examples, a difference may point to potential opportunities for improvement of the multi-modal machine learning model (and/or a critique for a human). In some examples, a similarity may provide corroboration for a summary and/or individual features of a summary and/or structured textual representation.

In some embodiments, the term "confidence score" refers to a measure of confidence for a summary, structured textual representation, and/or individual features thereof. A confidence score, for example, may be based on one or more performance insights. In addition, or alternatively, a confidence score may be based on a textual similarity between a user summary and/or entity representation summary.

In some embodiments, the term "prediction-based action" refers to an automated action based on an entity representation summary and/or user summary. In some examples, a prediction-based action may be an acceptance of a user summary and/or entity representation summary (e.g., based on a confidence score that exceeds a confidence threshold, such as a 75% threshold and/or the like). In some examples, a prediction-based action may be a rejection of a user summary and/or entity representation summary (e.g., based on a confidence score that fails to achieve a confidence threshold). In the event of an acceptance of a user summary and/or entity representation summary, a prediction-based action may include generating and/or providing an indication of the acceptance and/or one or more prompts based on the accepted summary. The one or more prompts, for example, may be indicative (e.g., include an identifier of, etc.) an accepted diagnosis and/or one or more recommended next steps for a clinical review.

In some embodiments, the term "performance alert" refers to a type of prediction-based action. A performance alert, for example, may include a presentation of a message (e.g., audible, textual, and/or the like) indicative of a low confidence score for a user summary and/or entity representation summary. A performance alert, for example, may be provided in the event of a rejection of a user summary and/or entity representation summary.

IV. Overview

Embodiments of the present disclosure present machine learning techniques that improve computer interpretation and summarization of data, including combinations of image- and text-based datasets. To do so, the present disclosure provides a multi-modal machine learning model that leverages multiple layers of text-based and image-based machine learning model to incrementally interpret and process associated text and images. The layers of the multi-modal machine learning model are jointly trained to learn intermediate representations that benefit from insights from a previous layer in the model. In this way, a text-based machine learning model may learn to leverage insights encoded by an image-based machine learning model, whereas an image-based machine learning model may learn to leverage insights encoded by a text-based machine learning model. The intermediate representations may include both textual (e.g., human interpretable) and encoded (weight matrices) representations that may be paired to track and interpret the insights generated at each layer of the model. This, in turn, enables the creation holistic outputs, while improving the interpretability of intermediate representations from which the holistic outputs are derived. Moreover, as described by the present disclosure, the intermediate representations from each layer may be compared against each other to generate performance insights for (i) refining the multi-modal machine learning model and/or one or more layers thereof and/or (ii) corroborating predicted features at each layer. Ultimately, this results in an improved machine learning model capable of leveraging insights from both text and image data to increase the accuracy and comprehensiveness of machine learning outputs in various prediction domains.

For example, image-based machine learning models may support reasoning by text-based machine learning models downstream tasks. By performing the integration of image and text data, a machine "impression" or "intuition" of the case may be preserved. This embedded structure may be passed as input to downstream deep learning systems, which may reinterpret this machine context when performing a variety of downstream tasks. These complex aggregations may be unpacked into a variety of decision support tasks including classification, ranking, confidence scoring, and concept identification. In a clinical domain, such findings may be broadly applied to augment clinical decision making by bounding the degree of support provided for a given decision, as well as providing novel outputs that may inform both clinicians and subject matter experts engaged in clinical review processes. By doing so, the multi-modal machine learning model of the present disclosure may, in some contexts, simplify workflows and prevent errors in diagnosis at audit, point of care, and/or qualitative review. For example, contextualized imaging information from a input image, such as a radiology image, that is extracted by an image-based layer of the model may serve as a first-level input to a text-based layer of the model interpreting an electrocardiogram (EKG) for a heart condition related to a radiology imaging event, and this input may then take advantage of a compressed form of information taking into account many related upstream observations.

In addition, or alternatively, the process may be run in reverse. For example, radiology images may be available in a medical record with historical textual reports for a patient from various other clinical experts. In such a case, aggregated NLP data resulting from the processing of historical textual records may influence the processing of the radiology images. In this way, clinical facts from narrative notes in a patient's medical history may be leveraged to interpret radiology images in view of contextual details that may help direct and/or explain objects within the images. In this way, text-based machine learning models may support reasoning by image-based machine learning models and may help such models flag patterns of information that may be missed without contextual information. By way of example, narrative reports in a patient medical history may describe previous radiology images with a legion that is a particular size. In such a case, the present of the legion in a subsequent image is not necessarily key, whereas an increase in the size of the legion is a crucial finding.

In some examples, the combination of image-based and text-based layers is a single multi-modal machine learning model may serve as a review document for an enhanced imaging event. For instance, in a clinical domain, the multi-modal machine learning model may be used to inform a variety of tasks. Using a radiology example, the context from the multi-modal machine learning model may lead to better imaging interpretation, supporting better decision making in a clinic. In addition, due to the preserved machine readable representations integrated with human readable support, high risk conditions with moderate to high likelihood may be identified and nonstandard vital measurements or lab diagnostics which may shorten the path to a diagnosis or allow early treatment, thus saving both patient duress and allowing more timely care for patients.

In some examples, outputs, such as entity representation summaries, diagnoses, and/or the like, that are generated by the multi-modal machine learning model for an imaging event may be stored in a record for an entity to generate an improved historical record. In a clinical domain, this improved record may facilitate better patient outcomes, quality of care, and analytics. For example, after a physician encounter, this information may be consumed by systems which provide supplementary information about the overarching organization efficiency and medical treatment as a whole. This may include recognition of patterns of decline of capability in various biological systems, recommending better physician follow-up or tools for modifying patient lifestyles before these problems become threatening. These tools may also be useful for analytics at the organizational level. Text produced by the multi-modal machine learning model may be incorporated to find trends of increasing disease or detect changes of profile in geographical sub-populations, allowing identification of environmental hazards.

Examples of technologically advantageous embodiments of the present disclosure include: (i) a multi-modal machine learning model for interpreting both text and image data in an end-to-end processing pipeline; (ii) intermediate representations for tracking and interpreting outputs of individual layers within a multi-modal machine learning model; (iii) machine learning performance monitoring and evaluation techniques for imaging events; (iv) multi-modal data interpretation techniques in which text-based layers of a machine learning model influence the processing of a images by image-based layers of the same model and vice versa, among other aspects of the present disclosure. Other technical improvements and advantages may be realized by one of ordinary skill in the art.

V. Example System Operations

As indicated, various embodiments of the present disclosure make important technical contributions to machine learning technology. In particular, systems and methods are disclosed herein that implement machine learning techniques and machine learning models for interpreting text and images in a fully connected model. Unlike traditional machine learning techniques, the machine learning techniques of the present disclosure leverage a multi-modal machine learning model that is specially configured to generate intermediate representations that may be passed, reinterpreted, and then augmented by multiple machine learning layers, each including different types of machine learning models. The different types of machine learning model include text-based layers configured to interpret natural language text and image-based layers configured to interpret input images. Each layer is configured to interpret a specific data type (e.g., natural language, input image, etc.) using context from a previous layer associated with a different data type.

Figure 3:
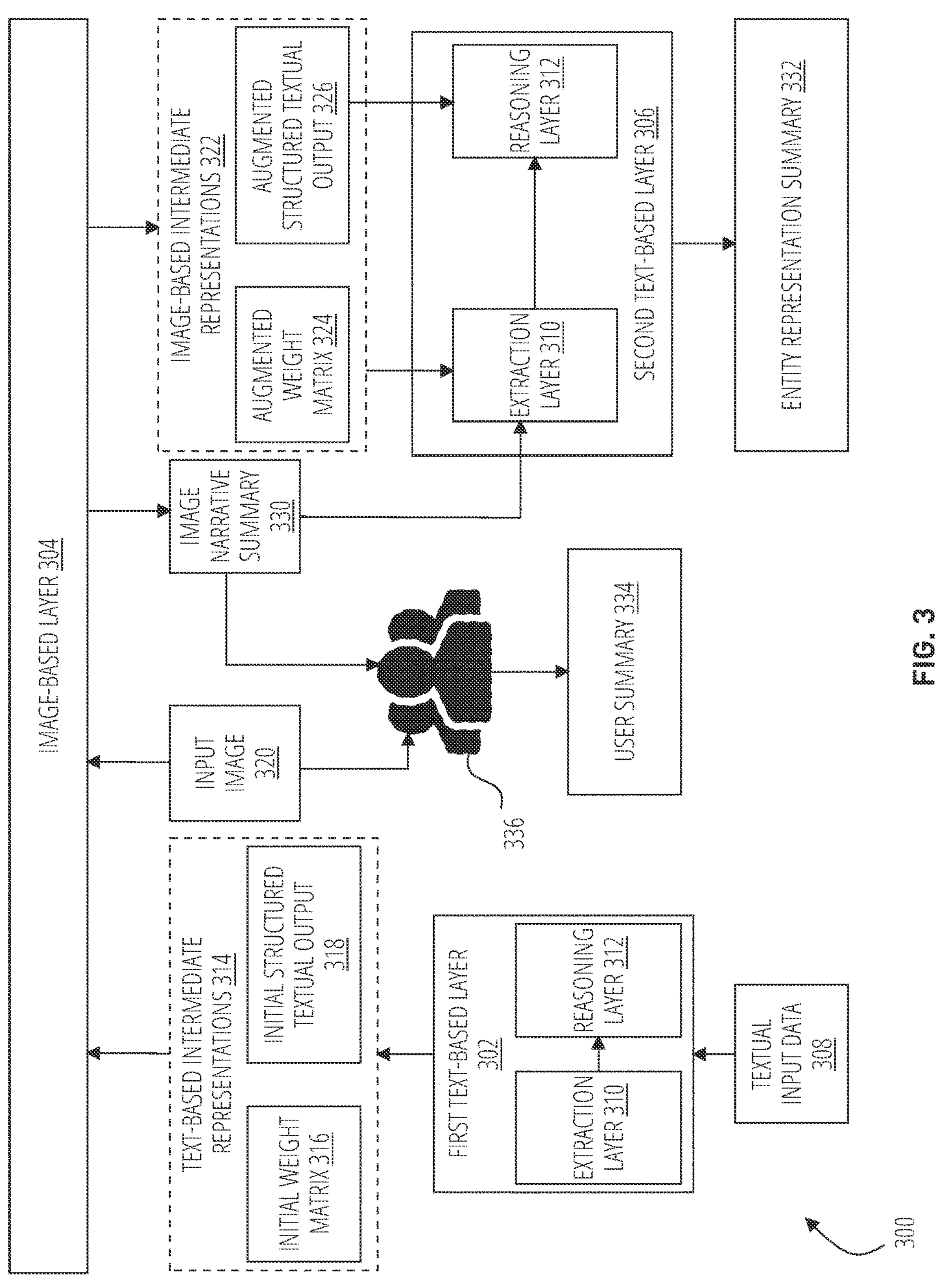
FIG. 3 is a dataflow diagram showing example data structures and modules for facilitating a multi-modal interpretation technique in accordance with some embodiments discussed herein.

FIG. 3 is a dataflow diagram 300 showing example data structures and modules for facilitating a multi-modal interpretation technique in accordance with some embodiments discussed herein. The dataflow diagram 300 depicts multi-modal machine learning model that includes multiple layers, including a first text-based layer 302, an image-based layer 304, and a second text-based layer 306. As shown, the multi-modal machine learning model may receive input data, such as the textual input data 308 and the input image 320, and generate an entity representation summary 332 based on the input data. The entity representation summary 332 may be generated across multiple stages at least partially performed by different layers of the multi-modal machine learning model. After each stage, one or more intermediate representations may be passed from one layer to the next layer of the multi-modal machine learning model until an entity representation summary 332 is generated.

In some embodiments, a multi-modal machine learning model is a data entity that describes parameters, hyper-parameters, and/or defined operations of a rules-based and/or machine learning model (e.g., model including at least one of one or more rule-based layers, one or more layers that depend on trained parameters, coefficients, and/or the like). The multi-modal machine learning model may include one or more machine learning models configured, trained (e.g., jointly, separately, etc.), and/or the like to generate an output (e.g., prediction, classification, coding, summarization, and/or the like) from a combination of related text- and image-based inputs. A multi-modal machine learning model may include one or more of any type of machine learning model including one or more supervised, unsupervised, semi-supervised, reinforcement learning models, and/or the like. In some examples, a multi-modal machine learning model may include multiple models configured to perform one or more different stages of a joint text and image interpretation process. For example, the multi-modal machine learning model may include a plurality of connected layers that may be configured to generate, pass, and interpret intermediate representations encoding information from the textual input data 308 and/or the one or more input images 320.

In some embodiments, the multi-modal machine learning model includes a plurality of model layers. The model layers may include one or more text-based layers and/or one or more image-based layers 304. For example, a multi-modal machine learning model may include one or more connected text-based layers and/or image-based layers 304 that provide and/or receive one or more inputs from each other to collectively generate an entity representation summary 332. One or more connected layers, for example, may include one or more first, second, and/or third layers. The one or more first layers may form a first text-based layer 302 configured to generate text-based intermediate representations 314 for consumption by one or more second layers. The one or more second layers may form an image-based layer 304, subsequent to the first text-based layer 302, that is configured to receive the text-based intermediate representations 314 from the first text-based layer 302 and generate the image-based intermediate representations 322 for consumption by one or more third layers. The one or more third layers may form a second text-based layer 306, subsequent to the image-based layer 304, that is configured to receive the image-based intermediate representations 322 from the image-based layer 304 and generate an entity representation summary 332 for output.

In some embodiments, the multi-modal machine learning model is trained using one or more supervised training techniques. For example, the plurality of layers may be trained end-to-end using a labeled training dataset. In addition, or alternative, the plurality of layers may be trained at least partly individually, for example, by freezing one or more weights of a subset of layers, while training another subset of layers. Each of the plurality of layers may be trained using one or more supervised training techniques, such as back propagation of errors based on a loss function tailored to the desired output (e.g., ground truths in the labeled training dataset, etc.).

In some embodiments, the multi-modal machine learning model is configured (e.g., trained, etc.) to generate one or more outputs based on a prediction domain. For example, the multi-modal machine learning model may be trained to generate a classification, impute information and/or coding, and/or to enhance computing tasks, such as quality review. As one example, in a clinical domain, a multi-modal machine learning model may improve the performance with respect to disease imputation, classification, and coding, and provides the mechanisms for each individual solution to be used for quality review and enhancement of the other. For example, the multi-modal machine learning model may be configured to generate an entity representation summary 332 that holistically summarizes an imaging event for an entity based on textual input data 308 associated with the entity and/or imaging event and input images 320 collected during the imaging event. For example, in a clinical domain, an entity representation summary 332 may include a summary (and/or diagnosis, etc.) from a radiology screening that summarizes radiology images using historical patient records and/or an imaging order for the radiology screening as contextual knowledge.

At a first stage, the multi-modal machine learning model is configured to receive textual input data. The textual input data 308 may include one or more of a historical entity data record and/or a contextual image record corresponding to the one or more input images 320. In some examples, the historical entity data record and/or contextual image record may correspond to an entity. For instance, the historical entity data record may be a data record for the entity and/or the contextual image record may be a record for an imaging event for the entity.

In some embodiments, an entity is a data element that is associated with input data for a multi-modal machine learning model. An entity may include a data element that is associated with both textual input data 308 and/or one or more input images 320. An entity may depend on a prediction domain. For example, in a clinical domain, an entity may represent a patient that is associated with an imaging event, such as a radiology screening, in which the patient is imaged to generate the one or more input images 320. In such a case, the textual input data 308 may include medical records and/or an order for the clinical screening.

In some embodiments, the textual input data 308 refers to a data entity that describes natural language and/or structured textual information. The textual input data 308 may include any form of textual data, such as natural language documentation recorded, received, and/or generated (e.g., through one or more generative artificial intelligence techniques) for any type of prediction domain. In some examples, the textual input data 308 may include a historical entity data record and/or a contextual image record. A historical entity data record may include textual information indicative of (e.g., including identifiers or descriptions for) historical information for an entity that is not directly related to an input image 320. In some examples, a historical entity data record may include an entity representation summary 332 that summarizes a previous imaging event for the entity. A contextual image record may include textual information indicative of (e.g., including identifiers or descriptions for) textual information directly describing an input image 320.

The textual input data 308 may depend on the prediction domain. In some examples, for a clinical domain, a historical entity data record may include documentation of patient medical history, such as an entity representation summary 332 for a previous radiology screening. As other examples, the historical entity data record may take the form of doctor's notes, vital measurements, familial health histories, and/or other narrative artifacts. In addition, or alternatively, a contextual image record may include an imaging order for an input image and/or a diagnostic hypothesis for the input image 320. In a clinical domain, this may include radiology screening order, and/or the like.

In some embodiments, the multi-modal machine learning model generates, using one or more first layers of the multi-modal machine learning model, one or more text-based intermediate representations 314 for the entity based on the textual input data 308. In some examples, the one or more text-based intermediate representations 314 may include one or more of an initial structured textual output 318 and/or an initial weight matrix 316 for the entity. The one or more first layers, for example, may include a first text-based layer 302.

In some embodiments, a text-based layer, such as the first text-based layer 302 and/or the second text-based layer 306, is a component of a multi-modal machine learning model. A text-based layer may include a data entity that describes parameters, hyper-parameters, and/or defined operations of a rules-based and/or machine learning model (e.g., model including at least one of one or more rule-based layers, one or more layers that depend on trained parameters, coefficients, and/or the like). A text-based layer may include one or more machine learning models configured, trained (e.g., jointly, separately, etc.), and/or the like to generate an output (e.g., prediction, classification, summarization, text-based intermediate representations 314, and/or the like) from text-based inputs, such as natural language and/or structured text. A text-based layer may include one or more of any type of machine learning model including one or more supervised, unsupervised, semi-supervised, reinforcement learning models, and/or the like. In some examples, a text-based layer may include multiple models configured to perform one or more different stages of a text interpretation process.

In some embodiments, a text-based layer includes a machine learning and/or rules based natural language processor. In some examples, a text-based layer may be configured to perform one or more algorithmic natural language processing operations, such as extraction and/or reasoning. An extraction operation, for example, may identify evidence of the presence and/or absence of various indicators in a narrative input text. For example, in a clinical domain, this may involve mentions of medical procedures, drugs, or vital measurements. A reasoning operation, for example, may include reasoning over extracted concepts (e.g., individually and/or in combination) from a narrative input text to give rise to more complex concepts. For example, in a clinical domain, a patient with a history of low body weight and drug references to specific medications may match to a certain cancer subtype, while the same patient with a high regiment of prescribed vitamin intake may be indicative of (e.g., include markers) for malnutrition.

In some embodiments, each layer of the multi-modal machine learning model is configured to output an intermediate representation that may be processed by a subsequent layer of the model. In some embodiments, an intermediate representation is an intermediate output generated by a layer of the multi-modal machine learning model. In some examples, an intermediate representation may include a structured textual output, such as the initial structured textual output 318 and/or augmented structured textual output 326, and/or a weight matrix, such as the initial weight matrix 316 and/or augmented weight matrix 324. For example, an intermediate representation may be augmented after each layer of a multi-modal machine learning model to pass insights from one modal layer to the next in at least a machine readable format. In this way, an intermediate representation may include an augmented data representation that merges imaging data and upstream machine learning outputs from the textual input data 308 and the input images 320 into a combined machine learning output that combines complex contexts into a more holistic embedded view of an imaging event. For example, insights captured by one or more text- and/or image-based layers may be fed to a subsequent layer as a series of vectors (e.g., embeddings, etc.), such as a weight matrix, and/or a structured textual format, such as a structured textual output, allowing the subsequent layer to take advantage of both human readable and machine readable concepts identified by each preceding layer.

By way of example, a weight matrix may include complex matrices of sets of weights from a last layer of a preceding portion (e.g., text- and/or image-based layer) of a multi-modal machine learning model. In addition, or alternatively, a structured textual output may include structured textual information that is extracted from the textual input data 308 and/or input images 320. A structured textual output, for example, may include an XML output that defines one or more segments of text extracted and/or generated for an input to a layer of the multi-modal machine learning model.

An intermediate representation may include text-based intermediate representations 314 output by a text-based layer of the multi-modal machine learning model and/or image-based intermediate representations 322 output by an image-based layer 304 of the multi-modal machine learning model.

In some embodiments, the text-based intermediate representations 314 is an intermediate representation generated by a text-based layer of the multi-modal machine learning model. In some examples, the text-based intermediate representations 314 may include an initial structured textual output 318 and/or initial weight matrix 316 output by a first text-based layer 302 of the multi-modal machine learning model. In some examples, the text-based intermediate representations 314 may include an initial structured textual output 318, such as a first structured XML output, and an initial weight matrix 316, such as an encoded weight representation for the first text-based layer 302. These inputs may be consumed together by the image-based layer 304 of the multi-modal machine learning model, which may include a purpose specific neural network with the ability to consume the initial structured textual output 318, the initial weight matrix 316, and the input images 320. The new context of the imaging allows the initial weight matrix 316 to be reinterpreted, boosting the likelihood of concepts identified by the first text-based layer 302. It is also able to use this context to highlight the most salient parts of the input images 320.

In some embodiments, the input images 320 are data entities that respectively describe pixel information. An input image may include any form of image data, such as an RGB image, an infrared image, a diagnostic image, and/or the like, that is received and/or generated for any type of prediction domain. In this regard, the input images 320 may depend on the prediction domain. For example, in a clinical domain, the input images 320 may include radiology images, such as X-Rays, MRIs, CT Scans, and Ultrasounds, and/or the like. In some examples, the input images 320 may be processed by the image-based layer 304 to detect suspect conditions and clinical factor examples that include, among many others, pneumonia, congestive heart failure, or specific lesions in the liver or breasts along with their characteristics such as size, shape, and specific location, etc.

In some embodiments, the multi-modal machine learning model generates, using one or more second layers of the multi-modal machine learning model, one or more image-based intermediate representations 322 for the entity based on the one or more text-based intermediate representations 314 and one or more input images 320 for the entity. In some examples, the one or more image-based intermediate representations 322 may include one or more of an augmented structured textual output 326 and/or an augmented weight matrix 324 for the entity. The one or more second layers, for example, may include an image-based layer 304.

In some embodiments, the image-based layer 304 is a component of the multi-modal machine learning model. The image-based layer 304 may include a data entity that describes parameters, hyper-parameters, and/or defined operations of a rules-based and/or machine learning model (e.g., model including at least one of one or more rule-based layers, one or more layers that depend on trained parameters, coefficients, and/or the like). The image-based layer 304 may include one or more machine learning models configured, trained (e.g., jointly, separately, etc.), and/or the like to generate an output (e.g., prediction, classification, summarization, image-based intermediate representations 322, and/or the like) from input images 320, such as a collection of pixels. The image-based layer 304 may include one or more of any type of machine learning model including one or more supervised, unsupervised, semi-supervised, reinforcement learning models, and/or the like. In some examples, the image-based layer 304 may include multiple models configured to perform one or more different stages of an image interpretation process.

In some embodiments, the image-based layer 304 includes a neural network architecture. For example, the image-based layer 304 may include one or more deep neural networks, such as one or more multilayer perceptrons (MLPs), convolutional neural networks (CNNs), recurrent neural networks (RNNs), and/or the like. The image-based layer 304 may be applied in any type of prediction domain to interpret a collection of pixels for generating a classification, prediction, and/or the like. As one example, the image-based layer 304 may be applied in a clinical domain to automatically identify suspect clinical factors and conditions directly from diagnostic images, such as radiology images including one or more of x-rays, MRIs, CT scans, Ultrasounds, and/or the like. Suspect conditions and/or clinical factors, for example, may include, among many others, pneumonia, congestive heart failure, specific lesions in the liver or breasts along with their characteristics such as size, shape, specific location, and/or the like. In some examples, the image-based layer 304 is trained via the application of machine/deep learning algorithms on large numbers of images with known clinical findings. By way of example, the image-based layer 304 may receive input images 320 that may be represented as arrays of pixel intensities. The image-based layer 304 may be trained (e.g., jointly and/or individually) on these examples then have a level of predictive accuracy on new, previously unseen images. In some examples, the image-based layer 304 may be trained to account for intermediate representations, such as the text-based intermediate representations 314, during the processing of the input images 320. In some examples, the image-based layer 304 may be trained to output image-based intermediate representations 322 based on the input images 320 and/or the text-based intermediate representations 314.

In some embodiments, the image-based intermediate representations 322 are intermediate representations generated by the image-based layer 304 of the multi-modal machine learning model. In some examples, the image-based intermediate representations 322 may include an augmented structured textual output 326 and/or an augmented weight matrix 324 output by a second layer, such as the image-based layer 304 following the first text-based layer 302 of a multi-modal machine learning model.

In some embodiments, the image-based intermediate representations 322 include an augmented structured textual output 326 and/or an augmented weight matrix 324. An augmented structured textual output 326 may include structured textual information extracted from the input images 320. An augmented weight matrix 324 may include complex matrices or sets of weights output by a last layer of the image-based layer 304. In some examples, these inputs may be consumed together by a text-based layer, such as the second text-based layer 306, of the multi-modal machine learning model that may include a purpose specific neural network, with the ability to consume an augmented structured textual output 326, an augmented weight matrix 324, and/or other outputs of the image-based layer 304, such as an image narrative summary 330. By way of example, in addition to the image-based intermediate representations 322, the image-based layer 304 of the multi-modal machine learning model may be configured to generate an image narrative summary 330 for the one or more input images 320. The image narrative summary 330, for example, may include a narrative synopsis of the input images 320 generated by an image-based layer captioning algorithm.

In some embodiments, the multi-modal machine learning model generates, using one or more third layers of the multi-modal machine learning model, an entity representation summary 332 based on the one or more image-based intermediate representations 322 and/or the image narrative summary 330. For example, the entity representation summary 332 may include a third structured textual output that is based on the augmented structured textual output 326 and/or the augmented weight matrix 324. The one or more third layers, for example, may include a second text-based layer 306.

In some embodiments, the entity representation summary 332 is an output of the multi-modal machine learning model. The entity representation summary 332 may include an unpacked intermediate representation output from a final layer (e.g., a second text-based layer 306, etc.) of the multi-modal machine learning model. In some examples, the intermediate representation may be unpacked in a variety of different ways. For example, the same upstream embedded output may be merged with unstructured textual data (e.g., clinician findings, etc.) to focus concept extraction on a classical natural language processing system by highlighting or de-emphasizing the importance of various textual observations. Using LLM the same embedded representation could also be unpacked into a machine-generated imaging description in plain text, a machine "impression" or "intuition" of a case, similar to that of an expert user 336 (e.g., a radiologist in a clinical domain, etc.), that may be presented along with the imaging data for review of the case by the user 336 (e.g., a radiologist, etc.).

In some embodiments, the entity representation summary 332 is a natural language text, such as a diagnosis for a clinical imaging event. In such a case, the entity representation summary 332 for an imaging event may be directly consumed by downstream text-based layers, which may extract rule-based concepts from the machine-generated text, allowing additional capture of information for downstream tasks. As another example, the entity representation summary 332 may include structured text, such as a further augmented structured textual output that may be directly consumed by downstream text-based layers and/or image-based layers 304 for downstream tasks. In some examples, the entity representation summary 332 may be recorded in association with an entity to serve as a summary of an imaging event. In such a case, the entity representation summary 332 may be considered by the multi-modal machine learning model as contextual data for a subsequent imaging event for the entity.

In some embodiments, the multi-modal machine learning model (e.g., one or more third layers thereof) receives a user summary 334 for the one or more input images 320. The user summary 334, for example, may be manually generated for the one or more input images 320 based on the input images 320 and an image narrative summary 330 for the input images 320. In some examples, the multi-modal machine learning model may generate, using the one or more third layers of the multi-modal machine learning model, the entity representation summary 332 based on the one or more image-based intermediate representations 322, the image narrative summary 330, and/or the user summary 334.

In some embodiments, the user summary 334 is natural language text provided by a user 336 to describe the input images 320. By way of example, the user summary 334 may include a textual summary of an imaging event. The textual summary may be manually generated by a human based on a human's interpretation of the input images 320 and/or contextual textual input data 308. By way of example, in a clinical domain, the user summary 334 may include a clinical finding, impressions, and/or the like for a clinical visit, such as a radiology screening.

In some embodiments, the performance of a prediction-based action is initiated based on the entity representation summary 332. A prediction-based action may include an automated action that is performed based on the entity representation summary 332 and/or a user summary 334. As described herein, the prediction-based action may include an acceptance of an entity representation summary 332 for a historical entity data record, one or more downstream actions (e.g., a subsequent imaging event, a clinical encounter, etc.) for an entity based on an entity representation summary 332, one or more retraining operations for the multi-modal machine learning model, and/or the like.

In some examples, a prediction-based action may be based on a performance insight for the multi-modal machine learning model and/or a layer thereof. For instance, a prediction-based action may include initiating a performance alert, scheduling a subsequent image event, and/or the like. In some examples, the performance insight may be used to evaluate the accuracy of the output of one or more components of the multi-modal machine learning model. An example of a process for evaluating one or more components of the multi-modal machine learning model will now further be described with reference to FIG. 4.

Figure 4:
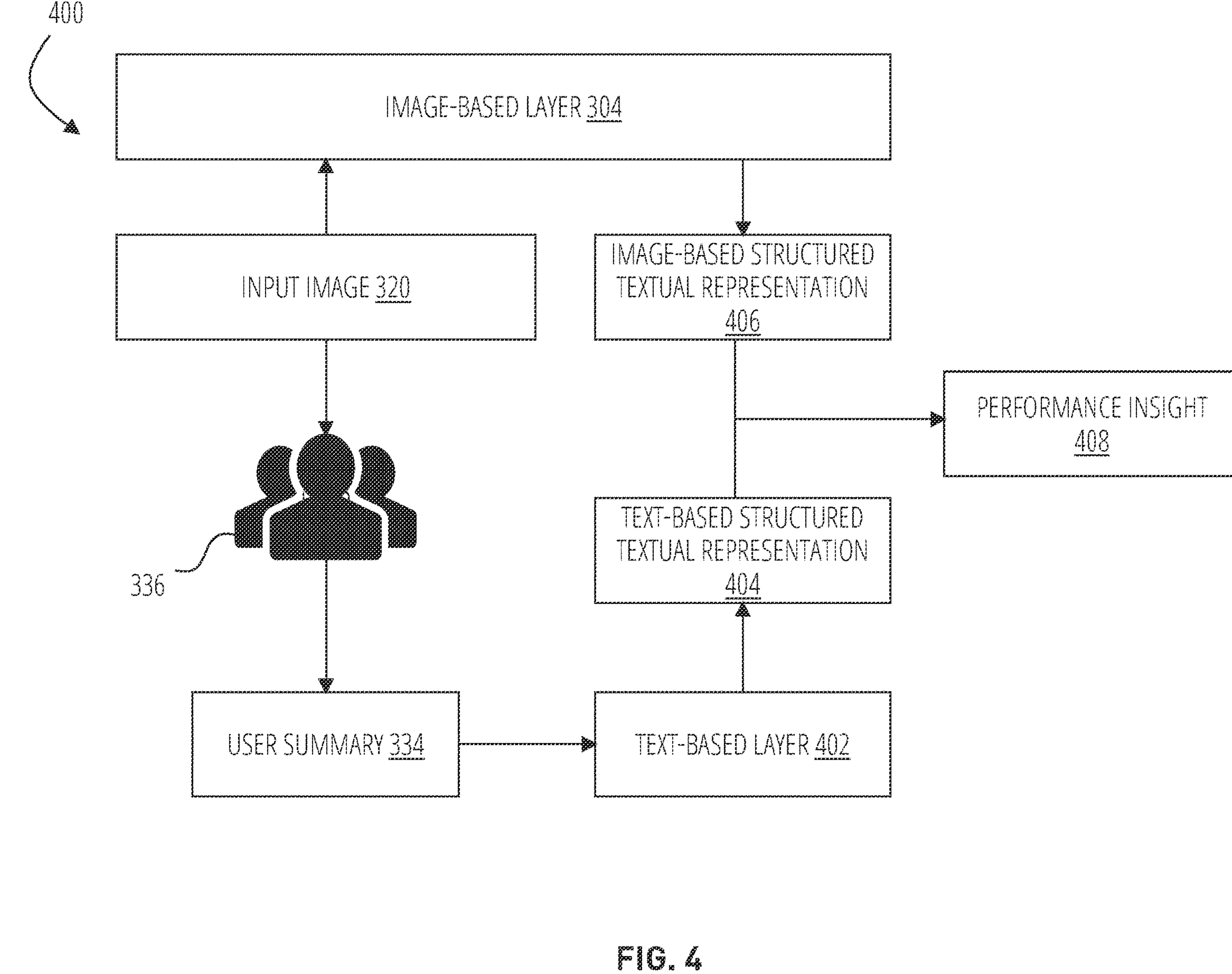
FIG. 4 is a dataflow diagram showing example data structures and modules for generating a performance insight in accordance with some embodiments discussed herein.

FIG. 4 is a dataflow diagram 400 showing example data structures and modules for generating a performance insight in accordance with some embodiments discussed herein. The dataflow diagram 400 shows an evaluation process in which a text-based layer 402 and an image-based layer 304 of a multi-modal machine learning model may be integrated for quality evaluation and enhancement of a training dataset. The dataflow diagram 400 includes an example performance insight 408 generated based on a comparison between an image-based structured textual representation 406 output by the image-based layer 304 and a text-based structured textual representation 404 output by a text-based layer 402. This illustrates one example integration of multi-modal layers to implement an evaluation process. For example, the depicted image-based structured textual representation 406 may include an entity representation summary output by the multi-modal machine learning model as described with reference to FIG. 3.

In some embodiments, an image-based layer 304 receives an input image 320 and generates an image-based structured textual representation 406 for the input image 320 based on the input image 320 and/or other data, such as a text-based intermediate representation. By way of example, the image-based structured textual representation 406 may include an augmented structured textual output 326. In some examples, the input image 320 (and/or image narrative summary data thereof) may be provided to a user 336, who may generate a user summary 334 for the input image 320 based on the user's domain knowledge. The user summary 334 may be provided to a text-based layer 402 to generate a text-based structured textual representation 404 for the input image 320.

In some embodiments, one or more performance insights 408 are generated based on a comparison between the text-based structured textual representation 404 and/or the image-based structured textual representation 406. In some examples, the one or more performance insights 408 may include a confidence score for the user summary 334, the image-based structured textual representation 406, the text-based structured textual representation 404, and/or one or more individual features from the user summary 334, the image-based structured textual representation 406, and/or the text-based structured textual representation 404.

In some embodiments, a performance insight 408 is a comparative analysis between an image-based structured textual representation 406 and a text-based structured textual representation 404. For instance, the representations may be compared to identify one or more differences and/or similarities. In some examples, a difference may point to potential opportunities for improvement of the image-based layer 304, text-based layer 402, and/or the outputs thereof. In some examples, a similarity may provide corroboration for a particular feature identified by both the text-based structured textual representation 404 and the image-based structured textual representation 406. In some embodiments, one or more performance insights 408 may be leveraged to generate a confidence score for the user summary 334, the image-based structured textual representation 406, the text-based structured textual representation 404, and/or one or more individual features thereof.

In some embodiments, a confidence score may include a measure of confidence (e.g., a percentage, probability, weight, etc.) for a summary, structured textual representation, and/or individual features thereof. A confidence score, for example, may be based on one or more performance insights. In this way, discrete and/or qualitative result confidence scores and/or analytics may be generated based on the representations output by the text- and/or image-based layers of the multi-modal machine learning model. By way of example, the confidence scores for individual features may be derived from a determination that a feature is an image-based finding (e.g., a feature included in an image-based structured textual representation 406), a text-based finding (e.g., a feature included in a text-based structured textual representation 404), and/or a common finding (e.g., a feature included in both representations). In this regard, an image-based finding may be indicative of (e.g., represent) an opportunity missed by either the text-based layer 402 and/or the user summary 334 or a false finding by the image-based layer 304. A text-based finding may be indicative of (e.g., represent) an opportunity missed by the image-based layer 304 and/or a false finding by the text-based layer 402. A common finding may be indicative of (e.g., represent) corroboration of the presence or absence of a finding.

In some examples, a performance insight 408 for the multi-modal machine learning model may be indicative of (e.g., represent) a comparison between a user summary 334 and an entity representation summary 332 output by the multi-modal machine learning model. In such a case, the performance insight 408 may be leveraged to perform a prediction-based action to, for example, (i) augment a training dataset with a summary (e.g., user summary 334, entity representation summary 332, etc.) and/or (ii) retrain at least a portion of the multi-modal machine learning model in response to the performance insight derived from a summary (e.g., user summary 334, entity representation summary 332, etc.). An example of a process for initiating a prediction-based action, such as a training and/or dataset augmentation action, will now further be described with reference to FIG. 5.

Figure 5:
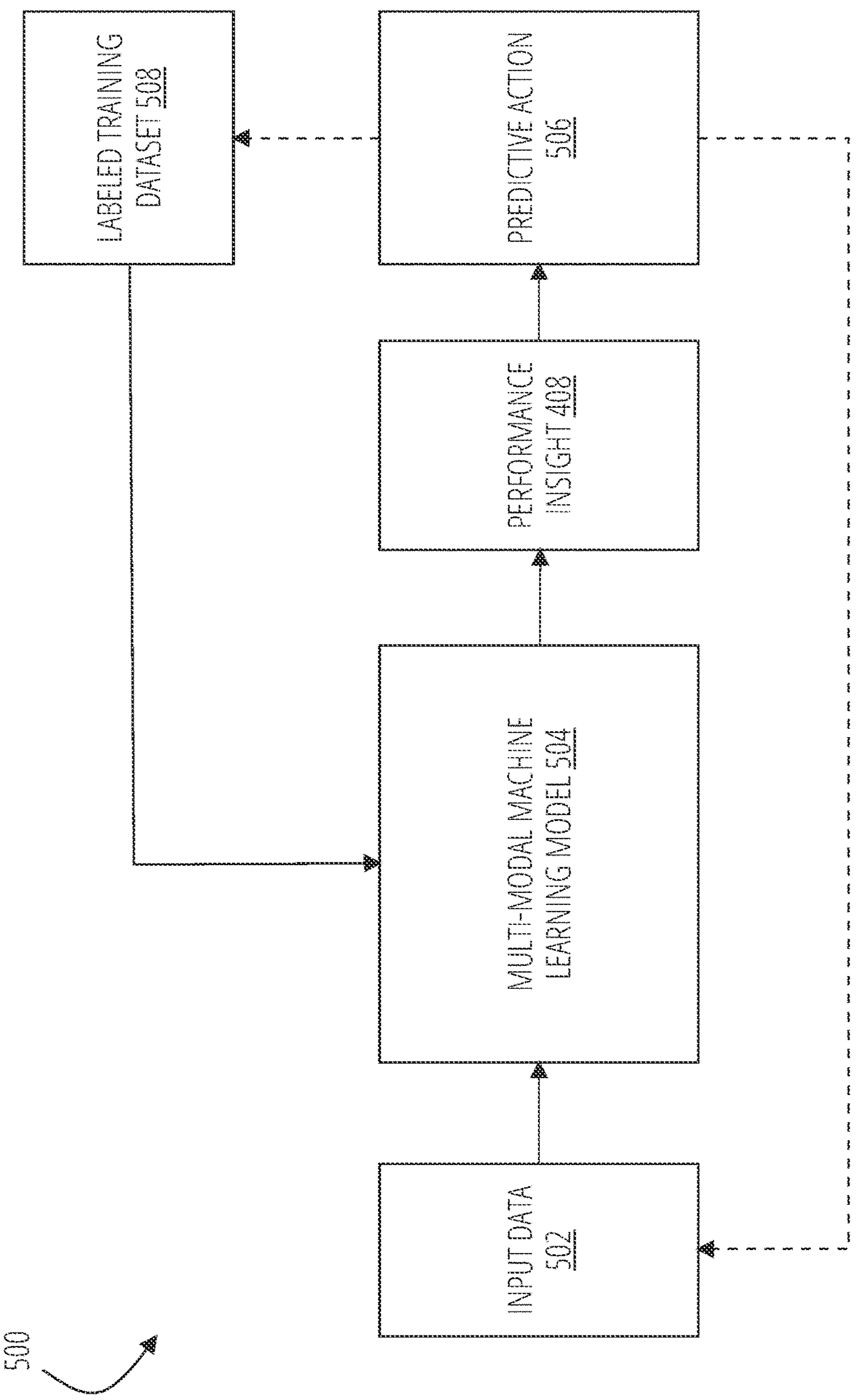
FIG. 5 is a dataflow diagram showing example data structures for initiating prediction-based actions for an entity using a multi-modal machine learning model in accordance with some embodiments discussed herein.

FIG. 5 is a dataflow diagram 500 showing example data structures for initiating prediction-based actions using a multi-modal machine learning model in accordance with some embodiments discussed herein. The dataflow diagram 500 includes a multi-modal machine learning model 504 that is configured to generate an output based on input data 502 that includes both image and text data. The output may include an entity representation summary and/or a post-processing output based on the entity representation summary 332, such as a prediction, classification, and/or for an entity associated with the input data 502. In some examples, a performance insight 408 may be generated based on the output from the multi-modal machine learning model 504.

In some embodiments, a performance insights 408 is generated based on a comparison between an entity representation summary and a user summary. In some examples, the performance insight 408 may be indicative of (e.g., a derivative of) a confidence score for the user summary and/or the entity representation summary. By way of example, a performance insight 408 may be based on one or more similar and/or different feature expressed in the entity representation summary and/or user summary. In some examples, a confidence score may be generated for the summaries based on performance insight 408. The confidence score, for example, may be based on a textual similarity between a user summary and/or entity representation summary.

In some embodiments, a prediction-based action 506 is initiated based on the one or more performance insights 408. For example, a performance alert 510 may be generated based on the one or more performance insight 408. In some examples, a performance alert 510 may be provided to a user, for example, to initiate another imaging event, update a labeled training dataset 508, update input data 502 (e.g., a historical entity data record), and/or the like.

In some embodiments, the prediction-based action 506 is an automated action based on an entity representation summary and/or user summary. In some examples, the prediction-based action 506 may be an acceptance of a user summary and/or entity representation summary (e.g., based on a confidence score that exceeds a confidence threshold, such as a 75% threshold and/or the like). In some examples, a prediction-based action may be a rejection of a user summary and/or entity representation summary (e.g., based on a confidence score that fails to achieve a confidence threshold). In the event of an acceptance of a user summary and/or entity representation summary, the prediction-based action 506 may include generating and/or providing an indication of the acceptance and/or one or more prompts based on the accepted summary. The one or more prompts, for example, may be indicative of (e.g., include an identifier of, etc.) an accepted diagnosis and/or one or more recommended next steps for a clinical review.

In some embodiments, a performance alert is a type of prediction-based action 506. A performance alert, for example, may include a presentation of a message (e.g., audible, textual, and/or the like) indicative of (e.g., including an identifier of) a low confidence score for a user summary and/or entity representation summary. A performance alert, for example, may be provided in the event of a rejection of a user summary and/or entity representation summary. In addition, or alternatively, a performance alert may be indicative of (e.g., including an identifier of) an acceptance of an entity representation summary and may include a presentation of a message (e.g., audible, textual, and/or the like) that is indicative of (e.g., including an identifier of) the entity representation summary.

In some embodiments, textual input data for the multi-modal machine learning model is augmented based on the performance insight 408. By way of example, an entity representation summary may be added to a historical entity data record for an entity. In some examples, the entity representation summary may be added to the historical entity data record in response to a confidence score that meets or exceeds a first confidence threshold (e.g., 75% accuracy, and/or the like). In some embodiments, a labeled training dataset is augmented based on the performance insight 408. In some examples, the entity representation summary may be added to the labeled training dataset in response to a confidence score that meets or exceeds a second confidence threshold (e.g., 95% accuracy, and/or the like).

In some embodiments, the labeled training dataset 508 is a dataset with one or more training input data objects and one or more training labels corresponding to the training input data objects. Each training input data object, for example, may include a historical and/or synthetic entity with textual input data and image input data. A training input data object may correspond with a training label that describes a target output for the multi-modal machine learning model 504. A training input data object and corresponding training label may depend on the prediction domain. By way of example, in a clinical domain, a training input data object may include patient records and/or radiology images associated with a radiology screen. A training label corresponding to the training input data object may include a textual summary, disease imputation (e.g., identifying the possibility of lung cancer), a classification (e.g., specifying the clinical severity of a lesion), coding (e.g., assigning appropriate ICD-10 CM codes to a chart), and/or any other target output for the multi-modal machine learning model 504.

In some embodiments, a target output for the multi-modal machine learning model 504 is an entity representation summary, such as a diagnosis for an imaging event associated with both text and image input, such as a radiology screening. The labeled training dataset 508 may include training input data objects that include (i) medical records and/or other textual information associated with the radiology screening and (ii) radiology images from the screening. A corresponding training label may include a target summary and/or diagnosis from the radiology screening. In some examples, the labeled training dataset 508 may include historical radiology screening records in which a physician provides a target diagnosis that is used to train the multi-modal machine learning model 504. For example, by training a multi-modal machine learning model 504 to approximate clinician output in a similar format, it is possible to compare the resulting concepts from the text- and image-based layers to approximate agreement between them. The multi-modal machine learning model 504 trained on images and patient history or demographic data may contain some degree of mutually exclusive information with a human produced account.

In some embodiments, the multi-modal machine learning model 504 is trained using the labeled training dataset 508. For example, the layers of the multi-modal machine learning model 504 may be trained end-to-end and/or at least partially independently. In some examples, the one or more first layers, the one or more second layers, and/or the one or more third layers of the multi-modal machine learning model may be trained end-to-end using the labeled training dataset.

In some examples, once trained, a multi-modal machine learning model 504 may stochastically generate many outputs from the same encounter, allowing comparison between those outputs for NLP-identified concepts, leading to approximation of the confidence in each concept. These agreement scores may be leveraged to find cases that are more likely to have omitted information, but also to identify which medical concepts are the most difficult to identify for subject matter experts. This information may guide subject matter expert education by identifying training opportunities, and potentially by creating generated outputs that demonstrate the concepts (e.g., review questions). In addition, or alternatively, the information output by the multi-modal machine learning model 504 may be vetted and then used to further augment the labeled training dataset 508.

FIG. 6 is a flowchart showing an example of a process 600 for interpreting information across multiple modes of representations in accordance with some embodiments discussed herein. The flowchart depicts a computer interpretation process for generating a predictive output from a combination of text and image data to overcome various limitations of traditional machine learning model techniques that are limited to either text or image interpretation. The computer interpretation process may be implemented by one or more computing devices, entities, and/or systems described herein. For example, via the various steps/operations of the process 600, the computing system 100 may generate, leverage, and retrain a multi-modal machine learning model capable of leveraging insights from both textual and image-based inputs to overcome various limitations (e.g., accuracy, breadth of knowledge, lack of input data, etc.) with traditional computer interpretation techniques. By way of example, unlike traditional interpretation techniques, the multi-modal machine learning model may be capable of synthesizing features extracted from multiple forms of recorded knowledge to generate holistic outputs, such as image summaries, prediction-based actions, and/or the like, that account for all forms of data available for a predictive event.

The multi-modal machine learning model of the present disclosure may integrate (e.g., through learning and passing relationship across layers in a fully connected network) image AI with NLP to achieve real world improvements in any prediction domain. As an example, in a clinical domain, image AI may be able to identify certain relationships that are not captured through NLP, such as associating multiple lesion sizes, characteristics and locations. NLP, on the other hand, may provide critical historical clinical information to image AI systems that is not available on an image itself (e.g., a history of smoking, historical size of lesion, etc.). The multi-model machine learning model include a plurality of layers, each including an image-based or text-based model configure to extract information from a specific type of data source (e.g., images, text, etc.). Each layer is feeds into another layer to iteratively generate a prediction based on both image and text information. In addition to intermediate predictions, each layer provides parameters to the next layer that influence the next layers algorithmic decisions. In this way, the multi-modal machine learning model may deep integrate text and image processing into a single processing pipeline configured to leverage and learn from insights across multiple data domains.

FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process 600 includes, at step/operation 602, generating one or more text-based intermediate representations. For example, the computing system 100 may generate, using one or more first layers of a multi-modal machine learning model, the one or more text-based intermediate representations for an entity based on textual input data. In some examples, the one or more text-based intermediate representations may include one or more of an initial structured textual output or an initial weight matrix for the entity. In some examples, the textual input data may include one or more of a historical entity data record and/or a contextual image record corresponding to one or more input images.

In some embodiments, the process 600 includes, at step/operation 604, generating one or more image-based intermediate representations based on the one or more text-based intermediate representations and one or more input image. For example, the computing system 100 may generate, using one or more second layers of the multi-modal machine learning model, the one or more image-based intermediate representations for the entity based on the one or more text-based intermediate representations and the one or more input images for the entity. In some examples, the one or more image-based intermediate representations may include one or more of an augmented structured textual output or an augmented weight matrix for the entity. In this manner, the one or more image-based intermediate representations may learn to incorporate textual insights derived from textual data. The resulting augmented structural textual output and corresponding augmented weight matrix may include comprehensive information that is both interpretable by a human (e.g., for model interpretability, etc.) and interpretable by a machine to provide greater context for downstream tasks. This, in turn, provides improvements to the performance and interpretability of traditional machine learning interpretation techniques.

In some embodiments, the process 600 includes, at step/operation 606, generating an entity representation summary based on the one or more image-based intermediate representations and an image narrative summary. For example, the computing system 100 may generate, using one or more third layers of the multi-modal machine learning model, the entity representation summary based on the one or more image-based intermediate representations and the image narrative summary for the one or more input images. In some examples, the entity representation summary may include a third structured textual output that is based on the augmented structured textual output and the augmented weight matrix. In some examples, the computing system 100 may augment the textual input data for an entity with the entity representation summary. The image narrative summary may be manually generated and/or automatically generated by an image-based machine learning model, such as an image-based layer of the multi-model machine learning model.

In some examples, the computing system 100 may receive a user summary for the one or more input images. The computing system 100 may generate, using the one or more third layers of the multi-modal machine learning model, the entity representation summary based on the one or more image-based intermediate representations, the image narrative summary, and the user summary.

In some embodiments, the one or more first layers, the one or more second layers, and the one or more third layers of the multi-modal machine learning model are trained end-to-end using a labeled training dataset. In some examples, the computing system 100 may generate one or more performance insights based on a comparison between the entity representation summary and a user summary. For example, the one or more performance insights may be indicative of (e.g., derivative of) a confidence score for the user summary and/or the entity representation summary.

In some embodiments, the process 600 includes, at step/operation 608, initiating the performance of a prediction-based action based on the entity representation summary. For example, the computing system 100 may initiate the performance of the prediction-based action based on the entity representation summary. In some examples, the computing system 100 may generate a performance alert based on the one or more performance insights and provide the performance alert to a user.

Some techniques of the present disclosure enable the generation of action outputs that may be performed to initiate one or more prediction-based actions to achieve real-world effects. The multi-modal interpretation techniques of the present disclosure may be used, applied, and/or otherwise leveraged to generate a multi-modal machine learning model, which may help in the computer interpretation and summarization of text, images, and/or combinations thereof. The multi-modal machine learning model of the present disclosure may be leveraged to initiate the performance of various computing tasks that improve the performance of a computing system (e.g., a computer itself, etc.) with respect to various prediction-based actions performed by the computing system 100, such as for the summarization of imaging events and/or the like. Example prediction-based actions may include the generation of a structured and/or abstractive summaries to summarize an imaging event and action automatically address aspects identified from the imaging event. For instance, the imaging event may be interpreted as identifying a condition (e.g., medical condition, and/or the like) for which a prediction-based action (e.g., a follow-up imaging event, a diagnosis, and/or the like) may be initiated to automatically address the condition.

In some examples, the computing tasks may include prediction-based actions that may be based on a prediction domain. A prediction domain may include any environment in which computing systems may be applied to achieve real-word insights, such as predictions (e.g., abstractive summaries, predictive diagnoses, etc.), and initiate the performance of computing tasks, such as prediction-based actions (e.g., scheduling a follow-up imaging event, prompting follow-up questions, generating a performance alert, etc.) to act on the real-world insights. These prediction-based actions may cause real-world changes, for example, by controlling a hardware component, providing alerts, interactive actions, and/or the like.

Examples of prediction domains may include financial systems, clinical systems, autonomous systems, robotic systems, and/or the like. Prediction-based actions in such domains may include the initiation of automated instructions across and between devices, automated notifications, automated scheduling operations, automated precautionary actions, automated security actions, automated data processing actions, automated data compliance actions, automated data access enforcement actions, automated adjustments to computing and/or human data access management, and/or the like.

In some embodiments, the interpretation techniques of the process 600 are applied to initiate the performance of one or more prediction-based actions. A prediction-based action may depend on the prediction domain. In some examples, the computing system 100 may leverage the interpretation techniques to initiate the summarization and computer comprehension of an imaging event, and/or any other operations for handling complex combinations of multi-modal data.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method, the computer-implemented method comprising generating, by one or more processors and using one or more first layers of a multi-modal machine learning model, one or more text-based intermediate representations for an entity based on textual input data; generating, by the one or more processors and using one or more second layers of the multi-modal machine learning model, one or more image-based intermediate representations for the entity based on the one or more text-based intermediate representations and one or more input images for the entity; generating, by the one or more processors and using one or more third layers of the multi-modal machine learning model, an entity representation summary based on the one or more image-based intermediate representations and an image narrative summary for the one or more input images; and initiating, by the one or more processors, the performance of a prediction-based action based on the entity representation summary.

Example 2. The computer-implemented method of example 1, wherein the one or more text-based intermediate representations comprise one or more of an initial structured textual output or an initial weight matrix for the entity, and the one or more image-based intermediate representations comprise one or more of an augmented structured textual output or an augmented weight matrix for the entity.

Example 3. The computer-implemented method of example 2, wherein the entity representation summary comprises a third structured textual output that is based on the augmented structured textual output and the augmented weight matrix.

Example 4. The computer-implemented method of any of the preceding examples, wherein the textual input data comprises one or more of a historical entity data record or a contextual image record corresponding to the one or more input images.

Example 5. The computer-implemented method of any of the preceding examples, wherein the one or more first layers, the one or more second layers, and the one or more third layers of the multi-modal machine learning model are trained end-to-end using a labeled training dataset.

Example 6. The computer-implemented method of any of the preceding examples, further comprising receiving a user summary for the one or more input images; and generating, using the one or more third layers of the multi-modal machine learning model, the entity representation summary based on the one or more image-based intermediate representations, the image narrative summary, and the user summary.

Example 7. The computer-implemented method of example 6, further comprising generating one or more performance insights based on a comparison between the entity representation summary and the user summary.

Example 8. The computer-implemented method of example 7, wherein the one or more performance insights are indicative of a confidence score for the user summary or the entity representation summary.

Example 9. The computer-implemented method of any of examples 7 or 8, wherein initiating the performance of the prediction-based action based on the entity representation summary comprises generating a performance alert based on the one or more performance insights; and providing the performance alert to a user associated with the user summary.

Example 10. The computer-implemented method of any of the preceding examples, further comprising augmenting the textual input data with the entity representation summary.

Example 11. A computing system comprising memory and one or more processors communicatively coupled to the memory, the one or more processors configured to generate, using one or more first layers of a multi-modal machine learning model, one or more text-based intermediate representations for an entity based on textual input data; generate, using one or more second layers of the multi-modal machine learning model, one or more image-based intermediate representations for the entity based on the one or more text-based intermediate representations and one or more input images for the entity; generate, using one or more third layers of the multi-modal machine learning model, an entity representation summary based on the one or more image-based intermediate representations and an image narrative summary for the one or more input images; and initiate the performance of a prediction-based action based on the entity representation summary.

Example 12. The computing system of example 11, wherein the one or more text-based intermediate representations comprise one or more of an initial structured textual output or an initial weight matrix for the entity, and the one or more image-based intermediate representations comprise one or more of an augmented structured textual output or an augmented weight matrix for the entity.

Example 13. The computing system of example 12, wherein the entity representation summary comprises a third structured textual output that is based on the augmented structured textual output and the augmented weight matrix.

Example 14. The computing system of any of examples 11 through 13, wherein the textual input data comprises one or more of a historical entity data record or a contextual image record corresponding to the one or more input images.

Example 15. The computing system of any of examples 11 through 14, wherein the one or more first layers, the one or more second layers, and the one or more third layers of the multi-modal machine learning model are trained end-to-end using a labeled training dataset.

Example 16. The computing system of any of examples 11 through 15, wherein the one or more processors are further configured to receive a user summary for the one or more input images; and generate, using the one or more third layers of the multi-modal machine learning model, the entity representation summary based on the one or more image-based intermediate representations, the image narrative summary, and the user summary.

Example 17. One or more non-transitory computer-readable storage media including instructions that, when executed by one or more processors, cause the one or more processors to generate, using one or more first layers of a multi-modal machine learning model, one or more text-based intermediate representations for an entity based on textual input data; generate, using one or more second layers of the multi-modal machine learning model, one or more image-based intermediate representations for the entity based on the one or more text-based intermediate representations and one or more input images for the entity; generate, using one or more third layers of the multi-modal machine learning model, an entity representation summary based on the one or more image-based intermediate representations and an image narrative summary for the one or more input images; and initiate the performance of a prediction-based action based on the entity representation summary.

Example 18. The one or more non-transitory computer-readable storage media of example 17, wherein the instructions further cause the one or more processors to receive a user summary for the one or more input images; and generate, using the one or more third layers of the multi-modal machine learning model, the entity representation summary based on the one or more image-based intermediate representations, the image narrative summary, and the user summary.

Example 19. The one or more non-transitory computer-readable storage media of example 18, wherein the instructions further cause the one or more processors to generate one or more performance insights based on a comparison between the entity representation summary and the user summary.

Example 20. The one or more non-transitory computer-readable storage media of examples 18 or 19, wherein the one or more performance insights are indicative of a confidence score for the user summary or the entity representation summary.

The invention claimed is:

1. A computer-implemented method comprising:

generating, by one or more processors and using a first layer of a multi-modal machine learning model, a text-based intermediate representation for an entity based on textual input data, wherein the textual input data comprises one or more of a historical entity data record or a contextual image record corresponding to a plurality of input images for the entity;

generating, by the one or more processors and using a second layer of the multi-modal machine learning model, an image-based intermediate representation for the entity based on the text-based intermediate representation and the plurality of input images;

generating, by the one or more processors and using a third layer of the multi-modal machine learning model, an entity representation summary based on the image-based intermediate representation and an image narrative summary for the plurality of input images; and initiating, by the one or more processors, performance of a prediction-based action based on the entity representation summary.

2. The computer-implemented method of claim 1, wherein:

the text-based intermediate representation comprises one or more of an initial structured textual output or an initial weight matrix for the entity, and the image-based intermediate representation comprises one or more of an augmented structured textual output or an augmented weight matrix for the entity.

3. The computer-implemented method of claim 2, wherein the entity representation summary comprises a third structured textual output that is based on the augmented structured textual output and the augmented weight matrix.

4. The computer-implemented method of claim 1, wherein the first layer, the second layer, and the third layer of the multi-modal machine learning model are trained end-to-end using a labeled training dataset.

5. The computer-implemented method of claim 1, further comprising:

receiving a user summary for the plurality of input images; and generating, using the third layer of the multi-modal machine learning model, the entity representation summary based on the image-based intermediate representation, the image narrative summary, and the user summary.

6. The computer-implemented method of claim 5, further comprising:

generating a plurality of performance insights based on a comparison between the entity representation summary and the user summary.

7. The computer-implemented method of claim 6, wherein the plurality of performance insights are indicative of a confidence score for the user summary or the entity representation summary.

8. The computer-implemented method of claim 6, wherein initiating the performance of the prediction-based action based on the entity representation summary comprises:

generating a performance alert based on the plurality of performance insights; and providing the performance alert to a user associated with the user summary.

9. The computer-implemented method of claim 1, further comprising:

augmenting the textual input data with the entity representation summary.

10. A system comprising:

one or more processors; and one or more memories storing processor-executable instructions that, when executed by the one or more processors, cause the one or more processors to perform operations comprising:

generate, using a first layer of a multi-modal machine learning model, a text-based intermediate representation for an entity based on textual input data, wherein the textual input data comprises one or more of a historical entity data record or a contextual image record corresponding to a plurality of input images for the entity;

generate, using a second layer of the multi-modal machine learning model, an image-based intermediate representation for the entity based on the text-based intermediate representation and the plurality of input images for the entity;

generate, using a third layer of the multi-modal machine learning model, an entity representation summary based on the image-based intermediate representation and an image narrative summary for the plurality of input images; and initiate performance of a prediction-based action based on the entity representation summary.

11. The system of claim 10, wherein:

the text-based intermediate representation comprises one or more of an initial structured textual output or an initial weight matrix for the entity, and the image-based intermediate representation comprises one or more of an augmented structured textual output or an augmented weight matrix for the entity.

12. The system of claim 11, wherein the entity representation summary comprises a third structured textual output that is based on the augmented structured textual output and the augmented weight matrix.

13. The system of claim 10, wherein the first layer, the second layer, and the third layer of the multi-modal machine learning model are trained end-to-end using a labeled training dataset.

14. The system of claim 10, wherein the one or more processors are further configured to:

receive a user summary for the plurality of input images; and generate, using the third layer of the multi-modal machine learning model, the entity representation summary based on the image-based intermediate representation, the image narrative summary, and the user summary.

15. The system of claim 14, further comprising:

generating a plurality of performance insights based on a comparison between the entity representation summary and the user summary.

16. The system of claim 15, wherein initiating the performance of the prediction-based action based on the entity representation summary comprises:

generating a performance alert based on the plurality of performance insights; and providing the performance alert to a user associated with the user summary.

17. One or more non-transitory computer-readable media storing processor-executable instructions that, when executed by one or more processors, cause the one or more processors to perform operations comprising:

generating, using a first layer of a multi-modal machine learning model, a text-based intermediate representation for an entity based on textual input data, wherein the textual input data comprises one or more of a historical entity data record or a contextual image record corresponding to a plurality of input images for the entity;

generating, using a second layer of the multi-modal machine learning model, an image-based intermediate representation for the entity based on the text-based intermediate representation and the plurality of input images;

generating, using a third layer of the multi-modal machine learning model, an entity representation summary based on the image-based intermediate representation and an image narrative summary for the plurality of input images; and initiating performance of a prediction-based action based on the entity representation summary.

18. The one or more non-transitory computer-readable media of claim 17, wherein the one or more processors are caused to perform operations further comprising:

receive a user summary for the plurality of input images; and generate, using the third layer of the multi-modal machine learning model, the entity representation summary based on the image-based intermediate representation, the image narrative summary, and the user summary.

19. The one or more non-transitory computer-readable media of claim 18, wherein the one or more processors are caused to perform operations further comprising:

generate a plurality of performance insights based on a comparison between the entity representation summary and the user summary.

20. The one or more non-transitory computer-readable media of claim 19, wherein the plurality of performance insights are indicative of a confidence score for the user summary or the entity representation summary.

* * * * *